US012785391B2

(12) United States Patent
Lee et al.

(10) Patent No.: US 12,785,391 B2
(45) Date of Patent: Nov. 3, 2026

(54) ENERGY STORAGE OPTIMIZATION

(71) Applicant: Polestar Performance AB, Gothenburg (SE)

(72) Inventors: Chih Feng Lee, Västra Frölunda (SE); Kalle Ingvar Bjurek, Mölnlycke (SE); Victor Hagman, Gothenburg (SE); Yang Li, Gothenburg (SE); Changfu Zou, Gothenburg (SE); Anton Björn Klintberg, Gothenburg (SE); Emanuella Patrycija Wallin, Mölndal (SE)

(73) Assignee: POLESTAR PERFORMANCE AB, Gothenburg (SE)

( * ) Notice: Subject to any disclaimer, the term of this patent is extended or adjusted under 35 U.S.C. 154(b) by 436 days.

(21) Appl. No.: 18/326,962

(22) Filed: May 31, 2023

(65) Prior Publication Data

US 2023/0396064 A1 Dec. 7, 2023

Related U.S. Application Data

(60) Provisional application No. 63/365,677, filed on Jun. 1, 2022.

(51) Int. Cl.
*G05B 15/02* (2006.01)
*B60L 58/16* (2019.01)
(Continued)

(52) U.S. Cl.
CPC .............. *H02J 3/003* (2020.01); *B60L 58/16* (2019.02); *G05B 15/02* (2013.01); *G06Q 50/06* (2013.01);
(Continued)

(58) Field of Classification Search
CPC ...... H02J 3/003; H02J 13/00002; H02J 3/322; H02J 2203/20; H02J 7/005; H02J 3/004;
(Continued)

(56) References Cited

U.S. PATENT DOCUMENTS

2017/0337646 A1* 11/2017 Zhou ...................... B60L 58/12
2021/0273483 A1* 9/2021 Ding ...................... H02J 9/068

FOREIGN PATENT DOCUMENTS

WO 2011156776 A2 12/2011
WO 2012072679 A1 6/2012
(Continued)

OTHER PUBLICATIONS

Alshahrani , et al., "Electric Vehicles Beyond Energy Storage and Modern Power Networks: Challenges and Applications", Institute of Electrical and Electronics Engineers Access, vol. 7, Jul. 15, 2019, pp. 99031-99064.

(Continued)

*Primary Examiner* — Yuhui R Pan
(74) *Attorney, Agent, or Firm* — Kilpatrick Townsend & Stockton LLP

(57) ABSTRACT

The disclosure relates to a device configured to optimize an energy storage strategy of a community comprising a plurality of households. Further, the disclosure relates to a cloud computing device configured to optimize an energy storage strategy of a community comprising a plurality of households. Further, the disclosure relates to an electric vehicle associated with a household in a community comprising a plurality of households, the electric vehicle comprising a battery aging model indicative of a battery aging status of a battery pack of said electric vehicle. Further, the disclosure relates to methods directed to optimize energy storage of households and communities.

15 Claims, 6 Drawing Sheets

(51) Int. Cl.
*G06Q 50/06* (2024.01)
*H02J 3/00* (2026.01)
*H02J 13/12* (2026.01)
*H02J 3/32* (2026.01)
*H02J 103/30* (2026.01)

(52) U.S. Cl.
CPC ............... *H02J 13/12* (2026.01); *H02J 3/322* (2020.01); *H02J 2103/30* (2026.01)

(58) Field of Classification Search
CPC .......... H02J 3/32; H02J 3/381; H02J 2300/24; H02J 2310/12; H02J 3/466; H02J 2203/10; B60L 58/16; B60L 8/003; B60L 53/665; B60L 53/68; G05B 15/02; G06Q 50/06; G06Q 10/06315; G06Q 10/047
See application file for complete search history.

(56) References Cited

FOREIGN PATENT DOCUMENTS

| | | | |
|---|---|---|---|
| WO | 2019140279 | A1 | 7/2019 |
| WO | 2022010969 | A1 | 1/2022 |

OTHER PUBLICATIONS

EP23175594.3 , "Extended European Search Report", Oct. 26, 2023, 10 pages.

* cited by examiner

ENERGY STORAGE OPTIMIZATION

CROSS-REFERENCE TO RELATED APPLICATION

This application claims the benefit of U.S. Provisional Application No. 63/365,677 filed Jun. 1, 2022, the entire content of which is hereby incorporated for all purposes in its entirety.

TECHNICAL FIELD

The present disclosure relates to power grid distribution, and more particularly relates to optimized power grid distribution based on battery age modeling and even more particular related optimized power grid distribution on electric vehicle battery age modeling.

BACKGROUND OF THE INVENTION

Global electricity consumption has been increasing steadily throughout the years while simultaneously, numbers show an increase in the share of renewable energy sources in power generation. This development is an important step in reducing global warming.

However, production from renewable energy sources, such as wind power and photovoltaics, are weather dependent. This adds an uncertainty factor when the Transmission System Operators (TSOs) schedules power exchange. An increasing share of electric vehicles (EVs) will impose further challenges for power production to meet power consumption. The sales market share of EVs has increased from 0.89% to 8.57% in just five years between 2016-2021, and EVs worldwide are estimated to consume over 30 TWh yearly at the moment. The increase in EV charging will add an additional uncertainty to the scheduled power exchanges and create power demand peaks when several owners want to charge their EVs, particularly in the afternoon or evening.

Increasing electric vehicle sales will lead to higher energy demand. This results in the increased operating cost of electric vehicle. Additionally, battery metals prices continue to rise, aggravating battery cost. Growing concern on greenhouse emission may lead to the reduction of fossil fuel consumption and uptake of renewable energy. However, the supply of renewable energy is volatile, a fact which is exacerbated by the changing weather patterns. In favorable weather conditions (when the wind is strong and the sun is shining), a large surplus of energy is generated, leading to curtailment. On the other hand, non-ideal weather conditions resulted in insufficient power available in the grid, leading to high electricity price and power outages. Volatile renewable energy supply also leads to the increased dependence on natural gas. Because of volatile renewable energy supply and gas price, the energy price will be unstable.

At the same time, utilization rate of passenger vehicles are often very low, typically below 15%. A majority of the vehicle's time is spent parked. The batteries in electric vehicles can therefore be used to support the grid by, for example, flattening the demand curve by scheduled charging during off-peak hours or releasing energy during demand peaks.

Electricity price and household energy demand both vary with time. Often high price corresponds to high energy demand (morning/evening peaks) and often low price corresponds to a surplus of green energy. When energy supply is greater than demand, the AC frequency increases above the nominal (e.g., 50 Hz—Europe, 60 Hz—USA), and vice-versa. If the frequency escapes a certain range, power blackout will occur. TSOs generally pay for ancillary services to balance the frequency.

For the electrical system to work efficiently, there must be a balance between production and consumption of power. If there is a sudden deviation from the planned schedules of production and consumption, the frequency of the grid will be affected. A stable frequency is of utter importance since electrical appliances are produced to work at a certain frequency, and deviations can result in device failure. If production is higher than consumption, the frequency of the grid will rise above the nominal value, while if consumption is higher than production, the frequency will drop under the nominal value. In a synchronous area, the grid is connected with an AC network, meaning that the frequency is the same everywhere in a synchronous system.

Since the vehicle-to-home (V2H) and vehicle-to-grid (V2G) concepts involve additional charging and discharging of batteries, these can lead to premature battery degradation. Battery degradation is composed of cyclic aging and calendar aging, where cyclic aging is dependent on the usage of the battery while calendar aging is dependent on its age and storage conditions, such as State of Charge (SoC) and ambient temperature. This effect should be taken into account when developing strategies for V2H and V2G and analyzing their benefits both in terms of financial savings, and also in terms of maximizing performance of batteries in terms of power output and useful life.

For a majority of the time a vehicle spends parked, the vehicle battery can be used as a buffer to store electricity energy if the price is low, or if there is a surplus of green energy. The rate of battery aging is dependent on the current battery aging status.

Existing vehicle-to-grid ("V2G") solutions rely upon centralized optimization and energy dispatch calculations, resulting in a heavy computation load and a single point of failure. Battery aging is not considered.

BRIEF SUMMARY OF THE INVENTION

One way to avoid the above problems with peak demands is to implement smart charging that charges an electric vehicle (EV) when the electricity price is low, which usually corresponds to when power demand is low. Going further than the implementation of smart scheduling of charging, another strategy is to implement bidirectional charging and use the batteries of EVs for balancing the supply and demand for electricity, using so-called Vehicle-To-Everything (V2X) infrastructure. This could be to charge the EV battery when power demand is low, and to save the cheaply bought energy for later usage in a household, a concept called Vehicle-To-Home (V2H), or to deliver power back to the grid when the demand is high or when energy production is lower than consumption. The latter concept is an example of Vehicle-To-Grid (V2G). The V2X strategies also enable storage of energy from renewable sources for later use.

At least one object of the present disclosure is to provide devices and methods that reduce energy costs of a community while minimizing battery degradation costs of vehicles associated with households in said community. This is achieved by the appended claims.

The present disclosure relates to an edge computing device for optimizing an energy storage strategy of a household in a community comprising a plurality of households, the edge computing device comprises a household optimization engine being configured to receive at least a part of a community optimization strategy from a cloud computing device. The received community optimization strategy comprising instructions indicative of an energy storage strategy for said household, the energy storage strategy being adapted to optimize a collective energy storage of said community. The engine is further configured to determine, by adaptation of said instructions, an optimized household strategy based on an optimization criterion comprising said community optimization strategy and a battery aging model of at least one electric vehicle associated with said household.

An advantage of the device herein is that it allows for centralized optimization of energy allocation while also taking the individual household in account. Moreover, by incorporating the battery aging model of vehicles associated with said household, also the vehicles battery life can be preserved. Battery metals are expensive and harmful to the environment to produce. Accordingly, by taking battery aging costs into account when optimizing a household strategy, the vehicles battery can be preserved while allowing for the household to receive energy from the vehicle.

In some aspects herein, the household optimization engine is further configured to:

transmit said optimized household strategy to said cloud computing device, wherein if said optimized household strategy conforms with said community optimization strategy, the edge computing device is configured to implement said optimized household strategy.

The edge computing device is further configured to, based on said instructions comprised in the strategy, control an energy distribution, from at least one energy source connected to said household, for a predetermined time-period in accordance with said instructions, wherein said energy source is at least one of a local power generation systems, a power grid system, residential battery modules and battery cells of an electric vehicle connected to said household.

An advantage with this is that the household may receive energy from the battery cells of the vehicle while optimizing the battery aging costs thereof. Hence, the electric vehicle can have a charge-discharge scheme that allows battery aging thereof to be optimized while acting as an energy source to the household.

The community optimization strategy may comprise constraints, wherein said optimized household strategy is adapted to conform to said constraints. Hence, the household strategy may be adapted but only to an extent that conforms to the constraints of the community optimization strategy. Advantageously, the household can then maximize its own efficiency without excessively reducing the global strategy provided by the community optimization strategy.

The optimization engine may further be configured to, when determining said optimized household strategy minimize a sum of total household electricity cost and battery aging costs of each of said at least one electric vehicles.

The edge computing device may further be configured to determine, by said battery aging model, a battery aging status of said at least one electric vehicle.

The optimization criterion may further comprise local predictions for said household. Local predictions may comprise at least one of battery aging cost, household energy needs (e.g., household energy load, household energy demand), energy needs of the at least one vehicle, and solar panel generation. An advantage of this is that the energy distribution can be controlled based on local predictions. E.g., if the electric vehicle is not predicted to be utilized on a day where energy prices are high, energy distribution may be controlled to draw energy from the electric vehicle (taking battery aging costs into account).

The optimized household strategy may comprise a charge and discharge scheme for each one of the electric vehicles associated with said household, the charge and discharge scheme being based on said optimization criterion.

The present disclosure further provides a computer-implemented method for optimizing an energy storage strategy of a household in a community comprising a plurality of households, the method comprising receiving a community optimization strategy from a cloud computing device, the community optimization strategy comprising instructions indicative of an energy storage strategy for said household, the energy storage strategy being adapted to optimize a collective energy storage of said community. Further, the method comprises determining an optimized household strategy based on an optimization criterion comprising said community optimization strategy and a battery aging model of at least one electric vehicle associated with said household.

The present disclosure further discloses a computer-implemented method for optimizing an energy storage strategy of a community comprising a plurality of households, the method comprising the steps of determining a community optimization strategy being adapted to optimize a collective energy storage of said community, transmitting said community optimization strategy to each household in said community, the community optimization strategy comprising instructions indicative of an energy storage strategy for each household. Further, the method comprises receiving an adapted community optimization strategy from each household, determining if each received adapted community optimization strategy conforms with said community optimization strategy. Further, the method comprises granting implementation of each received adapted community optimization strategy that is determined as conforming with said community optimization strategy.

Hence the method provides advantages of optimizing a community strategy while taking household strategies into account.

The step of determining if each received adapted community optimization strategy conforms with said community optimization strategy may comprise evaluating if each adapted community optimization strategy deviates from constraints set in said instructions.

The present disclosure further relates to a cloud computing device configured to optimize an energy storage strategy of a community comprising a plurality of households, the cloud computing device being configured to transmit a community optimization strategy to each household in said community, the community optimization strategy comprising instructions indicative of an energy storage strategy for each household. Further, the device is configured to receive an adapted community optimization strategy from each household and determine if each received adapted community optimization strategy conforms with said community optimization strategy. Furthermore, the device is configured to grant implementation of each received adapted community optimization strategy determined as conforming with said community optimization strategy.

Hence, the cloud computing device provides a centralized optimization strategy that takes into account individual households as well.

There is also provided an electric vehicle associated with a household in a community comprising a plurality of households, the electric vehicle comprising a battery aging model indicative of a battery aging status of a battery pack of said electric vehicle, and control circuitry configured to receive a charge and discharge scheme from the edge computing device of any one of any aspect herein.

An advantage of the electric vehicle is that battery cells of the electric vehicle will have a reduced battery aging as the vehicle is configured to receive a charge/discharge scheme that takes the battery aging costs of the vehicle into account.

The present disclosure further provides a computer-readable storage medium storing one or more programs configured to be executed by one or more control circuitry, the one or more programs including instructions for performing the method of any aspect herein.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
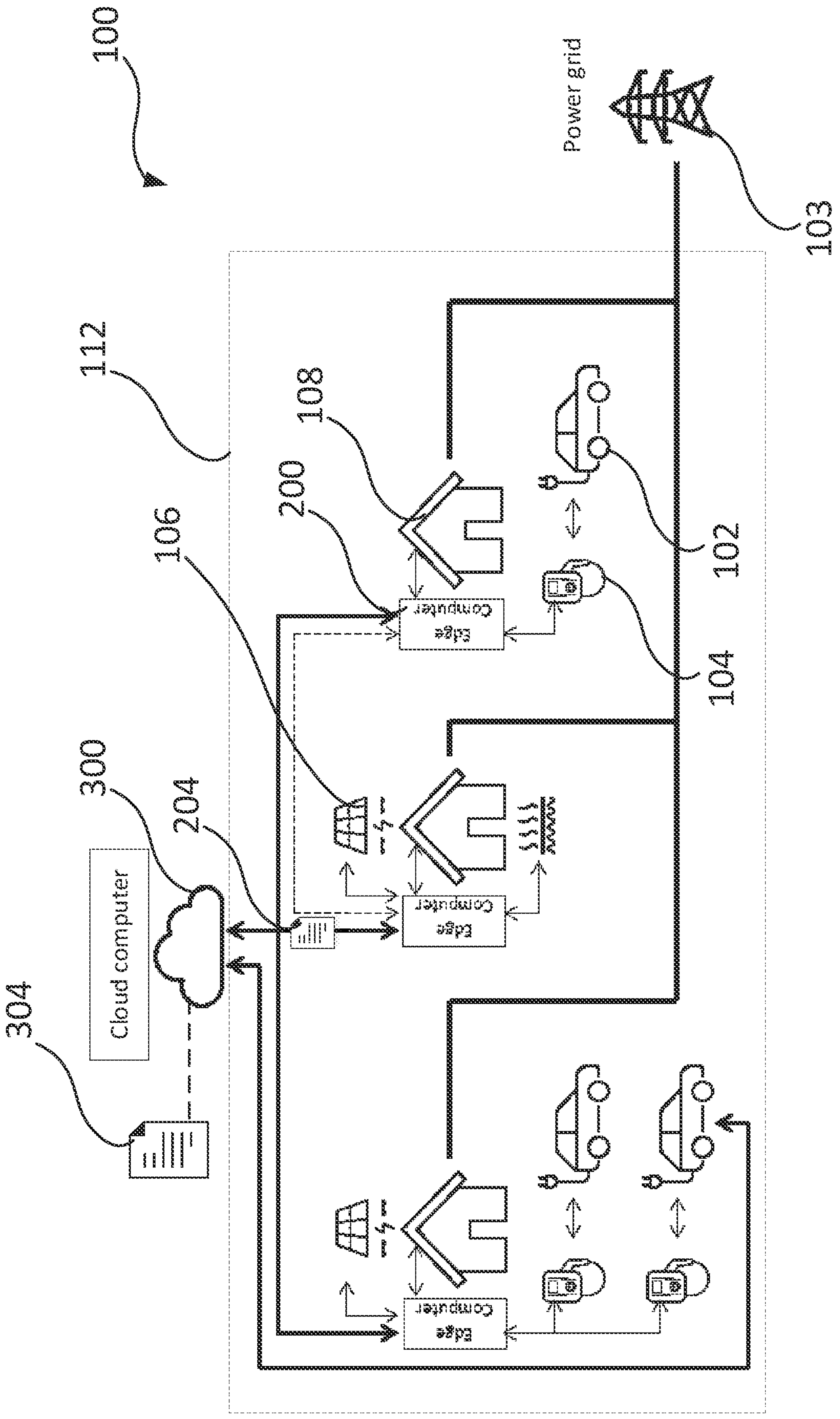
FIG. 1 is a schematic diagram depicting components and interactions of a vehicle-to-grid optimization system, according to embodiments of the present disclosure.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE INVENTION

Disclosed herein are several ways in which battery electric vehicles (EVs), hybrid vehicles, and fuel cell vehicles can be used to generate revenue by delivering energy to the grid. For example, disclosed herein are methods of selling energy to the grid when demand and prices are high, or by providing ancillary services in the form of spinning reserves and regulation services.

Embodiments of the present disclosure provide for distributed optimization considering different model fidelity between cloud devices and edge devices where the battery aging cost is considered. An edge device comprises an estimation algorithm that may probe and model battery capacity reduction during operation, predict a household energy demand based on past usage data, weather forecast and calendar events, and predict solar energy generation based on past usage data and weather forecast. A demand profile can be shared to cloud devices and other edge devices selectively to preserve privacy. As used herein, references to economical concepts such as cost, expense, profit, etc. are intended to encompass efficient use of energy, materials, and/or time in addition to or in lieu of purely monetary concepts.

FIG. 1 is a schematic diagram depicting components of, and interacted with, a distributed energy storage system 100, according to an embodiment. System 100 can be arranged to interact with one or more power sources, controllers, or storage devices, such as vehicles 102, electric vehicle supply equipment (EVSE) such as chargers 104, local power generators 106 (such as solar panels), and other local producers, stores, and users of energy as may be associated, with one or more locations, regions or households 108. Each household 108 can be associated with/comprising one or more edge computers 200. One or more cloud computers 300 can be communicatively coupleable with edge computer 200. Cloud computers 300 can be associated with one or more households 108 with in a community 112.

Accordingly, FIG. 1 illustrates edge computing devices 200 each being arranged to/for optimizing an energy storage strategy of a household 108 thereof in a community 112 comprising a plurality of households 108. The edge computing device 200 comprises a household optimization engine (illustrated in FIG. 2) being configured to receive a at least a part of a community optimization strategy 304 from a cloud computing device 300, the received community optimization strategy 304 comprising instructions indicative of an energy storage strategy for said household 108, the energy storage strategy being adapted to optimize a collective energy storage of said community 112.

The term "optimize" in view of households/communities herein may refer to that the energy storage strategy is adapted to maximally reduce monetary cost and/or an equivalent green-house gas emission cost of a household/community. The system 200 may be directed to optimize for future time-periods (e.g. coming hour, day, week month). The system 200 may be directed to optimize iteratively so to continuously optimizing a collective energy storage strategy of households/communities. Further, the method comprises determining, by adaptation of said instructions, an optimized household strategy 204 based on an optimization criterion comprising said community optimization strategy 304 and a battery aging model of at least one electric vehicle 102 associated with said household.

The term "strategy" may refer to a set of instructions/guidelines that when implemented by the system performing the method allows the system to execute the strategy. The strategy may comprise instructions for managing/controlling energy consumption and energy sources.

FIG. 1 illustrates that the household optimization engine 200 may be further configured to transmit said optimized household strategy 204 to said cloud computing device 300. Further, if said optimized household strategy 204 conforms with said community optimization strategy 204', the edge computing device 200 is configured to implement said optimized household strategy 204. Accordingly, the community optimization strategy 204 may comprise a set of defined constraints/boundaries. The community optimization strategy 204' may determine if said optimized household strategy 204 is within/in compliance with said boundaries and then allow/grant the edge computing device 200 to implement said optimized household strategy 204. The edge computing device 200 may further be configured to, based on said instructions comprised in the strategy control energy distribution, from at least one energy source connected to said household, for a predetermined time-period in accordance with said instructions. The energy source is at least one of a local power generation system 106, a power grid system 103, residential battery modules (e.g. home energy storage devices or any other battery of a household) and battery cells 102 of an electric vehicle connected to said household. When controlling, the method may select type of energy source that is to be utilized and the time-period said energy source may be utilized. Moreover, the controlling may also comprise controlling energy supply to energy demanding elements in a household. Energy demanding elements may comprise a house thermal system, water heating system, lighting system etc.

As illustrated in FIG. 1, the community optimization strategy 304 may comprise constraints, wherein said optimized household strategy 204 is adapted to conform to said constraints. For example, the community optimization strategy 304 may have a constraint stating that energy supplied from the power grid 103 may only reach a specific level. Then, the optimized household strategy 304 is configured to adapt the optimized household strategy to conform to said constraint.

The optimization engine 202 may be configured to, when determining said optimized household strategy, minimize a sum of total household electricity cost (monetary and in terms of emission) and battery aging costs of each of said at least one electric vehicles. The battery aging cost may comprise parameters being at least one of battery efficiency, battery capacity, battery state of health.

The edge computing device may further be configured to determine, by said battery aging model, a battery aging status of said at least one electric vehicle. This may be performed e.g., by transmitting probing signals to said vehicle.

Further, the optimization criterion may also comprise local predictions for said household. Local predictions may comprise at least one of battery aging cost, household energy needs, energy needs of at least one vehicle, and solar panel generation. The household energy demand may be derived based on current, previous demand and future demand (e.g. by obtaining calendar information and historic energy usage pattern).

The optimized household strategy 204 as illustrated in FIG. 1 may comprise a charge and discharge scheme for each one of the at least one electric vehicles associated with said household 108. The charge and discharge scheme allows for optimized battery aging and reduces energy costs as such for said household. In FIG. 1, the household strategy 204 is being transmitted to said cloud computing device 300. The household strategy being transmitted to said cloud computing device may be referred to as a locally adapted strategy and the household strategy being transmitted from cloud to edge may be referred to as an original strategy.

The phrase "electric vehicle 102 associated with a household", may refer to, as illustrated in FIG. 1 a vehicle 102 that is acknowledged/registered as a property by the edge computing device 200 of a household 108, the registered property belonging to said household. Hence, a vehicle may be regarded as associated to a household 108 if acknowledged/registered into the edge computing device 200 of said household 108.

Figure 2:
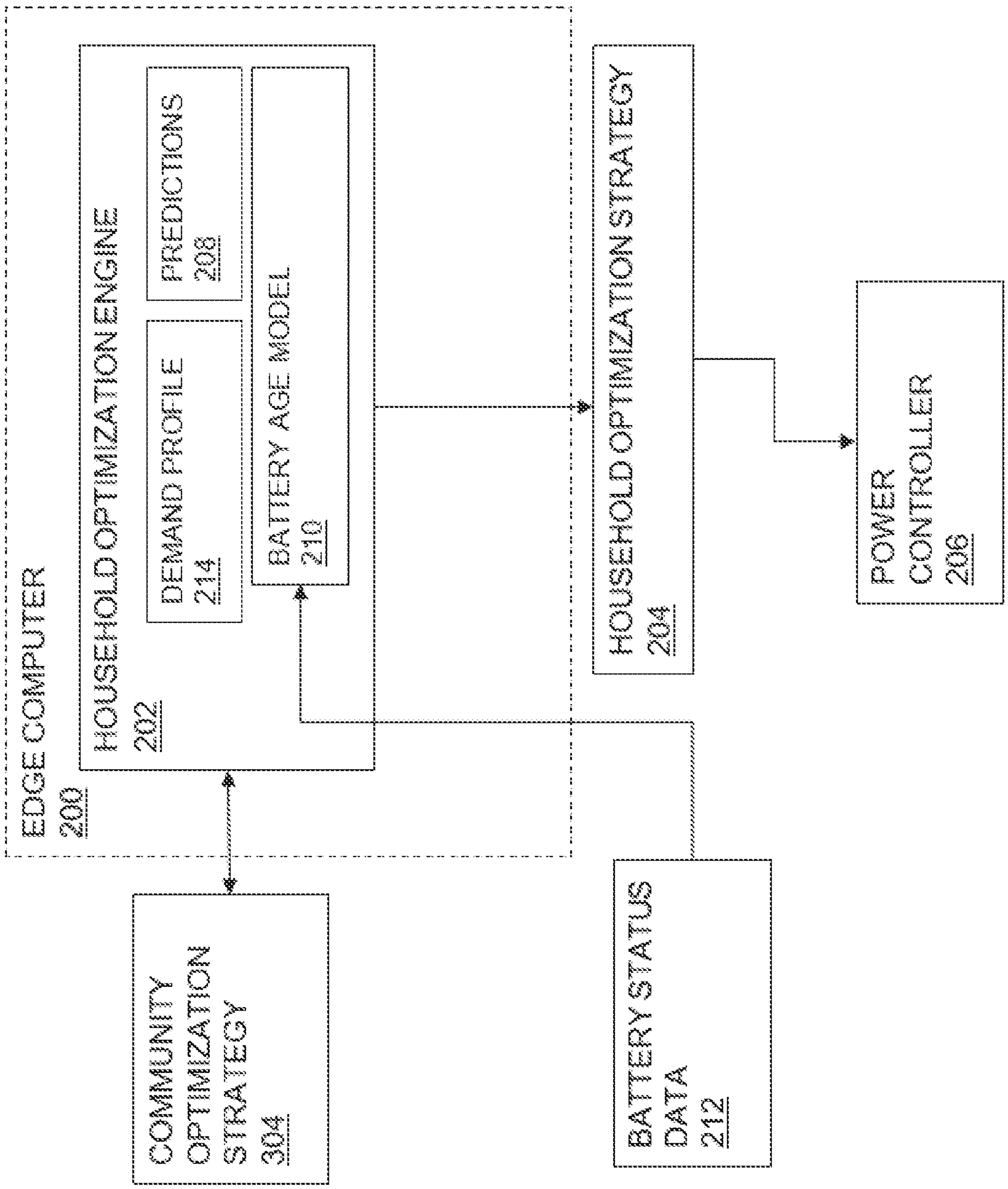
FIG. 2 is a schematic diagram depicting components of edge computing device, according to embodiments of the present disclosure.

FIG. 2 is a schematic diagram depicting components of household optimization engine 202. As described herein, household optimization engine 202 can determine an optimized (e.g., most economical or sustainable) energy storage strategy for the household 108. Household optimization strategy 204 can be used by power controller 206 to implement for power storage for one or more power related devices within household 108. For example, power controller 206 can be configured to control or interact with one or more EVs 102, chargers 104, or other power related devices to affect the transmission of power to or from each controlled device.

The optimized household strategy 204 can be based on, for example, a community optimization strategy 304 and local predicted information 208. Local predictions 208 can account for, for example, battery aging cost, household energy load, vehicle energy needs, and solar panel generation. Household optimization engine 202 comprises a battery age model 210. Battery age model 210 has an estimation algorithm to model the battery capacity reduction during operation. Battery model 210 can receive battery status data 212 from, for example, EVs 102 by sending probing signals. The modelling calculations used by battery model 210 are discussed in more detail below.

Predictions 208 may include predictions of the household energy demand based on, for example, past usage data, weather forecast and calendar events; predictions of solar energy generation based on past usage data and weather forecast. Household optimization engine 202 may generate a demand profile 214. Demand profile 214 can be shared to the community optimization engine 302 or other household optimization engines 202 selectively and/or in an anonymized form to preserve privacy.

Each household optimization engine 202 may also send, for example, updated/adapted strategies and/or and privacy preserving demand predictions to community optimization engine(s) 302 to cloud computer 300 or other household optimization engines 202.

In embodiments, household optimization engine 202 may be an application, program, module, system or subsystem run on or by edge computing device 200. In embodiments, edge computing device 200 may be absent and household optimization engine 202 may operate independently on local, cloud, or other distributed systems.

Figure 3:
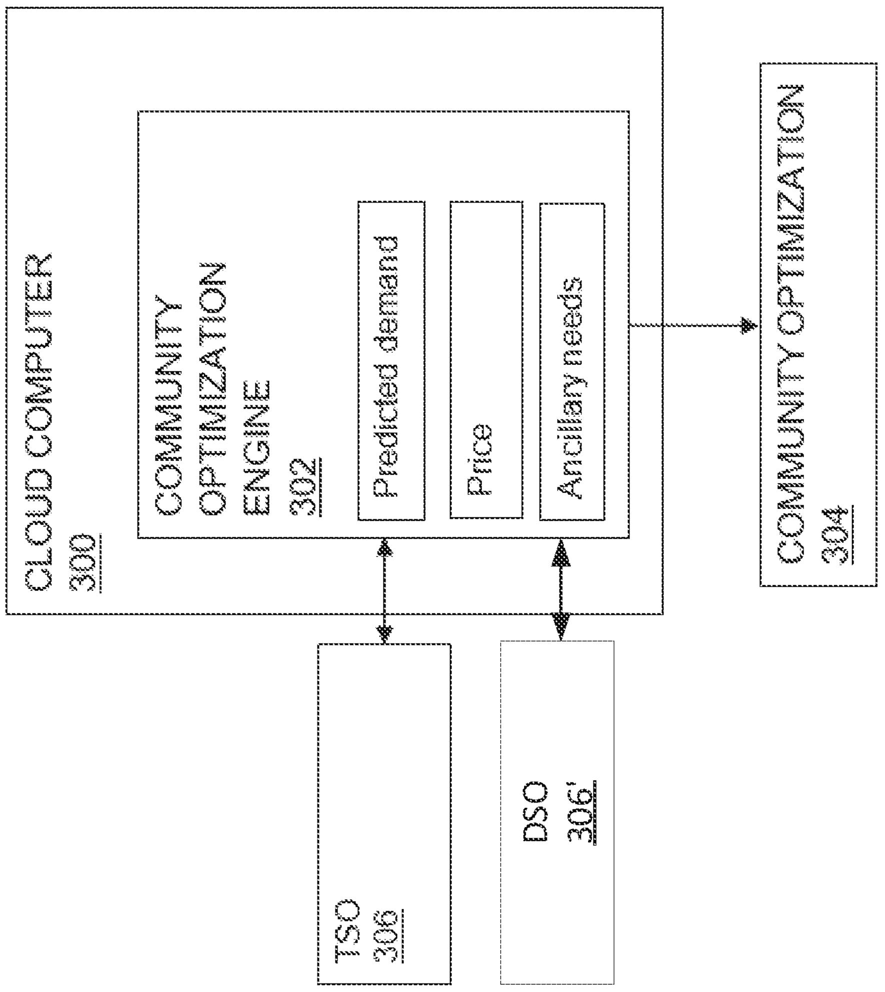
FIG. 3 is a schematic diagram depicting components of cloud computing device, according to embodiments of the present disclosure.

FIG. 3 is a schematic diagram depicting components of community optimization engine 302. Community optimization engine 302 computes an optimized (e.g., most economical or sustainable) energy storage strategy for the community 112. This computation of community optimization strategy 304 can account for, for example, future electricity price, predicted energy demand, and ancillary service needs. Inputs may be received, for example, from a TSO system 306, distribution system operator (DSO) 306' or other third-party system. In embodiments, inputs may be proactively sought by the community optimization engine 302 or calculated by the community optimization engine 302. Community optimization engine 302 also sends the optimized community strategy 304 to household optimization engine 202. In embodiments, community optimization engine 302 also computes and communicates a V2G strategy (e.g. arranged to reduce at least battery aging cost while also reducing energy costs) to participating vehicles 103 based on optimized community strategy 304.

The cloud computing device 300 as illustrated in FIG. 3 is configured to optimize an energy storage strategy of a community 112 (see FIG. 1) comprising a plurality of households 108, the cloud computing device 300 being configured to transmit a community optimization strategy to each household 108 in said community, the community optimization strategy comprising instructions indicative of an energy storage strategy for each household 108. Further, configured to receive an adapted community optimization strategy (adapted community optimization strategy may comprise or be interchanged with an optimized household strategy) from each household 108 and determine if each received adapted community optimization strategy conforms with said community optimization strategy. Further configured to grant implementation of each received adapted community optimization strategy determined as conforming with said community optimization strategy. The cloud computing device 300 may determine if said adapted community optimization strategy conforms with said community optimization strategy by determining if each adapted strategy is within defined constraints of said community optimization strategy and/or if all of the adapted optimization strategies jointly are within defined constraints of said community optimization strategy.

In embodiments, community optimization engine 302 may be an application, program, module, system or subsystem run on or by cloud computer 300. In embodiments, cloud computer 300 may be absent and community optimization engine 302 may operate independently on local, cloud, or other distributed systems.

One quantification of the impact on battery degradation caused by normal driving and frequency regulation services from V2G showed that over 5 years, 6.1% battery degradation came from calendar aging, 0.8% came from driving, while V2G frequency regulation added 2% additional battery degradation. As disclosed herein, an optimized bidding strategy for aggregators offering frequency regulation is to create synthetic data and use two-stage stochastic optimization to calculate potential profits in short-term electricity and regulation markets, for uni-directional charging of EVs. It should be noted that the present disclosure may provide a system 100 comprising the cloud computing device 300. Accordingly, each received adapted community optimization strategy may be obtained from edge computing devices 106 of any aspect herein.

Battery Modelling

While household optimization engine 202 can utilize a number of different schemes to determine battery age, two battery models are used by way of example to discuss the EV battery pack and associated charging system and method disclosed herein. The first model to be introduced is the Equivalent Circuit Model (ECM), followed by the Bucket Model (BM). The BM may simplify the ECM for usage in large-scale V2G application, to lower the computational complexity. In embodiments, battery age model 210 of FIG. 2 may comprise either the ECM or BM, or use both either interchangeably or according to predetermined criterion, or another battery model not discussed by example herein.

An EV battery pack consists of many battery cells that are configured in a certain structure to obtain desired battery pack specifications. When connecting multiple battery cells in series, the battery voltage will be the sum of the voltages of the individual cells. Hence, by assuming a cell voltage of 3.8 V, a battery voltage of 400 V would require 400/3.8≈105 cells connected in series. The battery capacity will however remain unchanged. For instance, assuming that the capacity of one cell is 2 Ah, the capacity of the battery pack will be 2 Ah. By connecting cells in parallel, the capacity of the battery pack will be the sum of the individual capacities of the cells connected in parallel. The voltage of the battery pack will be the voltage of the individual cells.

Figure 5:
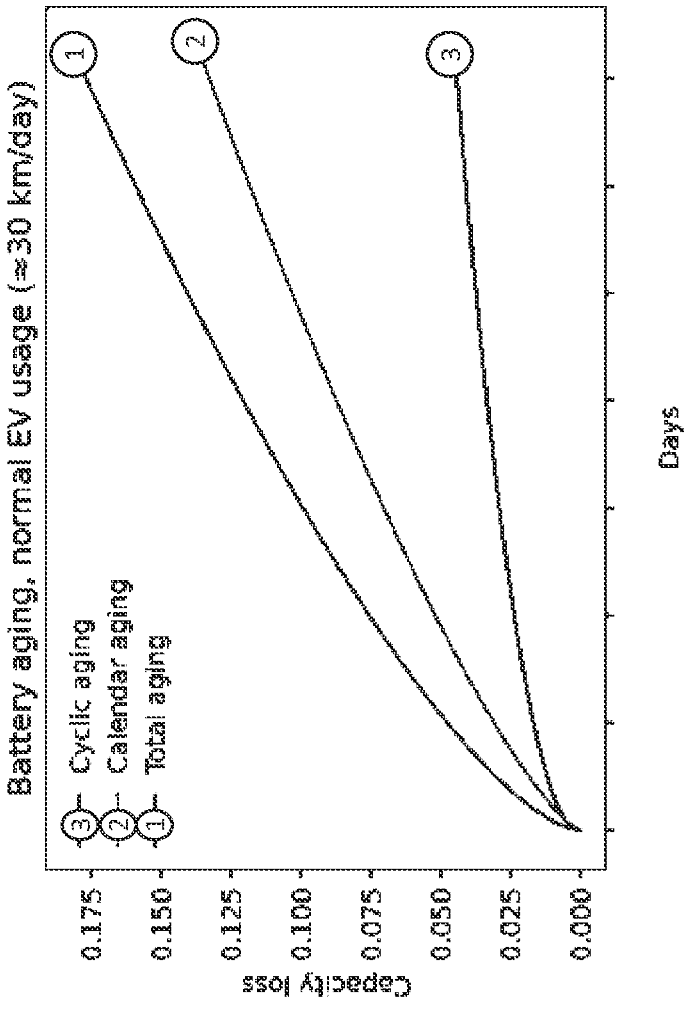
FIG. 5 is a graph of an example simulation of battery degradation using a battery model, according to embodiments of the present disclosure.

The battery degradation in the ECM is defined as the lost capacity due to calendar aging and cyclic aging. The ECM provides a suitable model for calculating the calendar aging and cyclic aging separately on a battery cell level. FIG. 5 depicts an example development of the calendar aging and cyclic aging over a simulation horizon of 10 years, assuming battery cell throughput from a normal driving pattern of 30 km/day, a constant battery temperature of 25 C, and a mean voltage and root mean square voltage corresponding to the voltage at 50% SoC, calculated using an open circuit voltage (OCV) curve. For practical applications, it may be desirable to get the additional degradation caused by a specific usage pattern during one single time period, given the historic operation of the battery cell. Thus, given the age and historical throughput of the battery cell, the added degradation during a specific time period can be approximated using a Taylor series expansion.

The Bucket Model (BM) is a simple battery model, also known as an energy reservoir model. As opposed to the ECM, the control variable in the BM is the power. In this model, there are no further restrictions except for limits on the power. Battery degradation may be calculated with the BM to match the battery degradation of the ECM. The battery degradation in the BM may accordingly be formulated as the sum of capacity loss due to calendar aging and cyclic aging.

A key difference between the ECM and the BM is that the ECM is given on a battery cell level, while the BM is given on a battery pack level. This implies that the battery in the BM is modeled as one big cell, while the ECM consists of several smaller cells of particular parameters.

Household Optimization

In Vehicle-to-Home (V2H) optimization, such as may be performed by household optimization engine 202, the battery models are generally incorporated into optimization problem setups with the objective to reduce the electricity cost of a single household. The EV battery may be used to store energy when electricity prices are low, to supply the energy to the household when electricity prices are high. If the electricity price difference during the day is large enough to cover efficiency losses in the conversions and the cost of increased battery degradation, the V2H optimization leads to a profit for the EV user.

Figure 4:
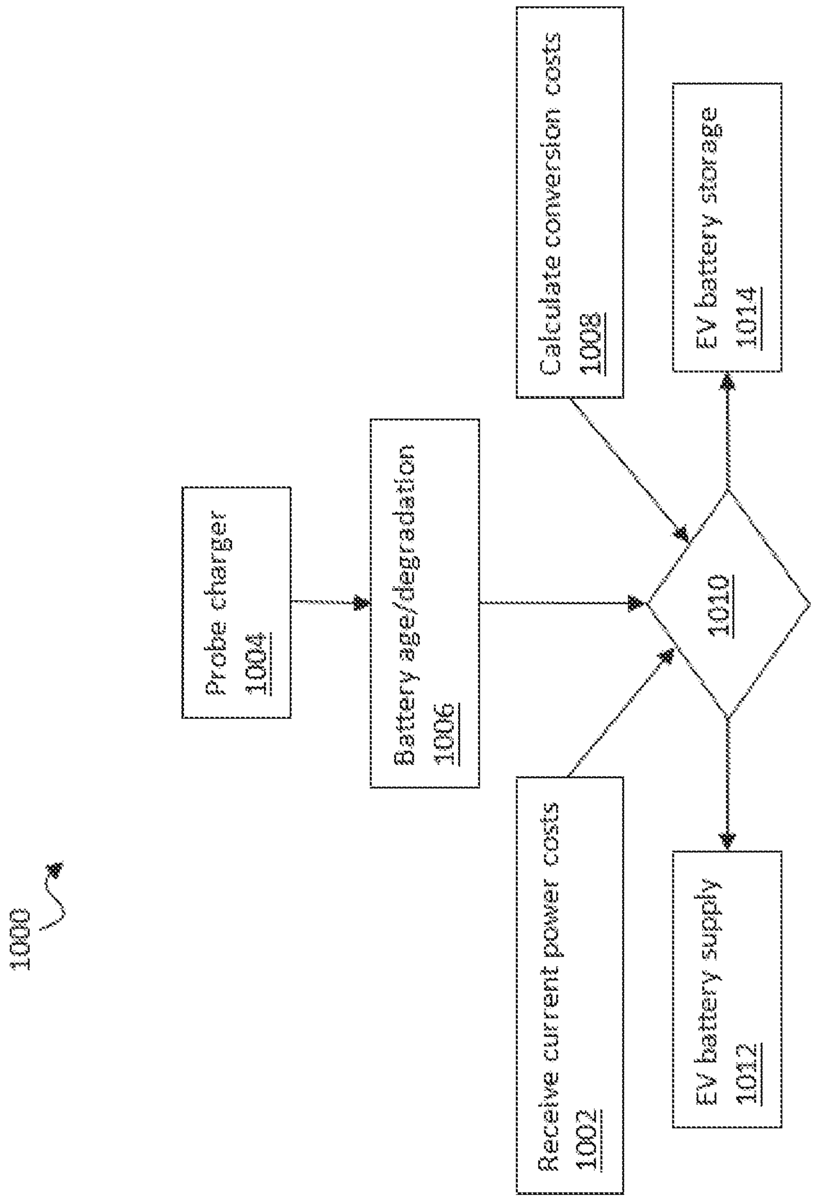
FIG. 4 is a flowchart of an example V2H method of optimization, according to embodiments of the present disclosure.

An example V2H method 1000, according to embodiments of the present disclosure, is shown in flowchart of FIG. 4. Example method 1000 may be performed by household optimization engine 202 of the power distribution system disclosed herein.

At 1002, the edge computer receives current power costs. Power costs may be received from the TSO, DSO or other third-party monitoring system or agency. Power costs may be received directly by the edge computer or household optimization engine, or via a community system, such as community optimization engine 302.

At 1004, the household optimization engine 202 probes the EV charger, such as charger 104 of FIG. 1. By probing the EV charger, the household optimization engine 202 can access current battery data to enable effective modeling of the battery age and degradation status. Data received from the charger may include mean voltage, temperature, time, state of charge, lifetime battery or cell throughput, throughput since last charge, operation since last charge, historic operation, etc.

At 1006, the household optimization engine 202 calculates one or more of: battery age, battery capacity, or the cost of increased battery degradation.

At 1008, the household optimization engine 202 calculates the conversion costs of using the EV battery to support the household power load.

At 1010, the household optimization engine 202 evaluates whether current power costs exceed the sum the conversion and battery degradation costs. If current power costs do exceed the conversion and degradation costs, the EV battery may be used to supplement household demand, at 1012. If power costs are lower than the conversion and degradation costs, the EV battery may be used as additional household power storage, at 1014.

The edge computer may additionally apply some constraints on the method 1000, such as setting a minimum SoC level (zmin) as a buffer which can help ensure that the EV is always available for the user, or a maximum SoC level (zmax), which can approximately correspond to the SoC at a proposed end of charge voltage. In an embodiment, zmin is set to 10% and zmax is set to 90%, though other minimum and maximum values can be used. In embodiments, the maximum energy output from the EV can be limited to the load of the household to ensure that energy from the EV cannot be delivered to the grid. Both when charging and discharging the EV, there will be losses, such as transformation losses between AC and DC. It should be noted that when determining said optimized household strategy and minimizing a sum of total household electricity cost and battery aging costs of each of said at least one electric vehicle the steps 1004-1012 may be utilized. Specifically, the strategy, when being determined, may evaluate/analyze whether current power costs exceed the sum of the conversion and battery degradation costs. In some aspects, the strategy may be determined to find a "sweet spot" minimizing power costs and battery degradation costs. This may be determined by providing an optimization problem setup adapted to minimize energy costs and battery degradation.

For the ECM, the potential to profit from using a V2H strategy is dependent on several factors, such as accumulated battery throughput, and battery age. The more the battery has been cycled before due to driving and charging, the less additional capacity loss will be induced by V2H operation, as can be inferred from FIG. 5. By considering driving distance per year and battery age, it is possible to calculate the accumulated throughput due to earlier driving. An additional factor to consider is the energy consumption per kilometer. This energy consumption can be used to calculate the ampere hour consumption on a cell level per day due to driving and may also account for the historical throughput due to charging.

To be able to compare the potential of utilizing V2H, two benchmarking models were used. Both models only allowed for unidirectional charging, meaning that no discharging was allowed. In one modeled experiment, nine use cases were executed using a V2H model and the two benchmarks. The first model, uncontrolled charging (UC), was set up such that the EV was charged to the reference SoC as quickly as possible when plugged in after arrival to the household. The second model, smart charging (SC), minimized the EV charging cost by scheduling the required charging to reach the reference SoC to the cheapest available hours within the time horizon.

The results analyzed include the total cost of household electricity, charging electricity, calendar aging, and cyclic aging during the optimization hours throughout a modeled year, using the predicted household load. Savings were compared to the case of uncontrolled charging. Battery degradation cost from cyclic aging and from calendar aging were each considered. It was determined that whether using energy from an EV battery is an optimized choice depends on historical throughput of the battery. By evaluating and incorporating battery age modeling into V2H systems, embodiments of the present disclosure enable such systems to effectively use the EV battery as a component of the household power system.

Community Optimization

In community or V2G optimization, a fleet of EVs and households have to be balanced. In addition to utilizing V2H, a community optimization engine may support the offering of power for frequency regulation to the TSO. There are a number of different types of aids for regulating the frequency of the grid. They differ in terms of requirements on activation speed and endurance, and the requirements also differ between countries. Some products available are Fast Frequency Reserve (FFR), Frequency Containment Reserve (FCR), automatic Frequency Restoration Reserve (aFRR), and manual Frequency Restoration Reserve (mFRR).

FCR stabilizes the frequency in case of deviations and is a vital part of regulating the frequency of the grid. The service is automatically activated if the frequency deviates inside the offered regulation region. The FCR is divided into two different products, FCR-N where the N stands for normal, and FCR-D where D stands for disturbance.

FCR-N is a symmetrical product offering frequency regulation in both up and down directions with the same amount of power. Procurement of FCR-N takes place two days and one day, before delivery. The majority of the capacity is procured two days ahead of delivery, and the rest one day before delivery. Called bids for FCR-N capacity are reimbursed according to "pay as bid," while energy compensation for activation is reimbursed according to the up and down regulation price.

FCR-D is a product offering frequency regulation only in one direction. Similarly as for the FCR-N, procurement of the FCR-D products takes place two days, and one day, before delivery. The majority of the capacity is procured two days ahead of delivery, and the rest one day before delivery. Called bids for FCR-D capacity are reimbursed according to "pay as bid," while there is no energy compensation for activation.

When considering optimization schemes for FCR-N, the bid has to be symmetrical in both up and down directions. To upregulate the frequency, the EVs can either stop charging or start discharging. To downregulate the frequency, the EVs can increase charging.

In one embodiment of a community optimization scheme, the objective value is the sum of the net electricity cost for all households, the income from offered regulating bids, the cost/income from bought/-sold energy from activation, and the cost of battery degradation. The optimization can be subject to similar constraints as discussed in the household optimization strategy above. A maximum possible upregulating bid for an hour is the sum of the charging power during hour t, and the absolute value of the maximum possible discharging power during hour t, since the bid is positive.

Similarly, the maximum possible downregulating bid for hour t is the difference between the charging power during hour t and the maximum possible charging during hour t. Constraints are modified to include the activation of the offered bid to add the efficiency to the activation, which was set to be equally distributed over all EVs, as well as to limit the possible discharging power to the households when bids are activated.

For FCR-D, in contrast to FCR-N, the bid does not have to be symmetrical as it encompasses separate products for upregulation and downregulation. It is rare that the frequency of the grid deviates to such degree that FCR-D resources must be activated to a high degree. The deviations are also generally restored rather fast which means that the resources do not have to be active for long periods.

As illustrated in FIG. 1, community optimization engine 302 can perform optimizations based on FCR-D or FCR-N bidding schemes using inputs received from TSO 306, household optimization engines 202, and/or participating power related devices to determine a community optimization strategy 304. Community optimization strategy 304 can comprise one or more constraints or coefficients that can be inputs to household optimization engine 202.

While not depicted with respect to community optimization engine 302, the community optimization engine 302 may also comprise a battery model, such as those described above with respect to the household optimization engine 202. In embodiments, each level of optimization can use a different battery model. For example, household optimization engines 202 can use an ECM model, whereas community optimization engines 302 may use a BM model, other combinations are also contemplated in embodiments. This enables distributed optimization which considers different model fidelity between community and household optimizations.

In some embodiments, the system 100 of FIG. 1 and/or its components or subsystems can include computing devices, microprocessors, modules and other computer or computing devices, which can be any programmable device that accepts digital data as input, is configured to process the input according to instructions or algorithms, and provides results as outputs. In one embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Figure 6A:
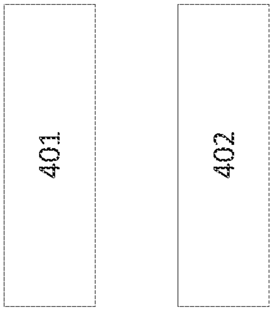
FIGS. 6A and 6B is a flowchart of methods of optimization, according to embodiments of the present disclosure.

FIG. 6A schematically, in the form of a flowchart illustrates a computer-implemented method 400 for optimizing an energy storage strategy of a household in a community comprising a plurality of households, the method comprising the steps of receiving 401 a community optimization strategy from a cloud computing device, the community optimization strategy comprising instructions indicative of an energy storage strategy for said household, the energy storage strategy being adapted to optimize a collective energy storage of said community. Further, the method comprises the step of determining 402 an optimized household strategy based on an optimization criterion comprising said community optimization strategy and a battery aging model of at least one electric vehicle associated with said household. Further, in some aspects the criterion may further comprise local prediction of energy needs or local prediction of energy generation of said household (by e.g. solar cells).

Figure 6B:
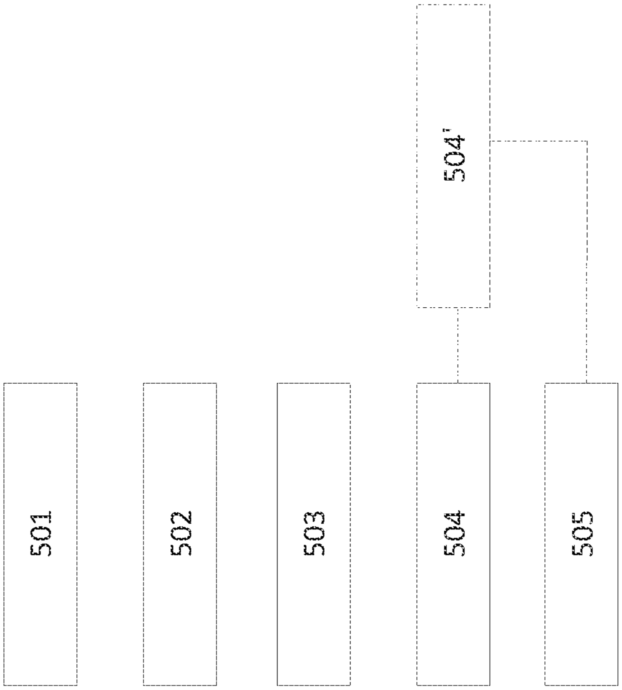

FIG. 6B illustrates, in the form of a flowchart, a computer-implemented method 500 for optimizing an energy storage strategy of a community comprising a plurality of households, the method 500 comprising the steps of determining 501 a community optimization strategy being adapted to optimize a collective energy storage of said community. The method further comprises the step of transmitting 502 said community optimization strategy to each household in said community, the community optimization strategy comprising instructions indicative of an energy storage strategy for each household. Further, the method comprises the steps of receiving 503 an adapted community optimization strategy from each household, determining 504 if each received adapted community optimization strategy conforms with said community optimization strategy and granting 505 implementation of each received adapted community optimization strategy that is determined as conforming with said community optimization strategy. Each received adapted community optimization strategy may be adapted to optimize a household strategy of said household, said household strategy being based on an optimization criterion comprising said community optimization strategy and a battery aging model of at least one electric vehicle associated with said household. The step of determining 504 if each received adapted community optimization strategy conforms with said community optimization strategy may comprise evaluating 504' if each adapted community optimization strategy deviates from constraints set in said instructions.

Computing and other devices discussed herein can include memory. Memory can comprise volatile or non-volatile memory as required by the coupled computing device or processor to not only provide space to execute the instructions or algorithms, but to provide the space to store the instructions themselves. In one embodiment, volatile memory can include random access memory (RAM), dynamic random access memory (DRAM), or static random access memory (SRAM), for example. In one embodiment, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In one embodiment, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right.

Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

What is claimed is:

1. An edge computing device for optimizing an energy storage strategy of a household in a community comprising a plurality of households, the edge computing device comprises a household optimization engine being configured to:

receive at least a part of a community optimization strategy from a cloud computing device, the received community optimization strategy comprising instructions for controlling energy consumption of said household and energy sources in said household, wherein the instructions are indicative of an energy storage strategy for said household, the energy storage strategy being adapted to optimize a collective energy storage of said community; and determine, by adaptation of said instructions, an optimized household strategy based on an optimization criterion comprising said community optimization strategy and a battery aging model of at least one electric vehicle associated with said household.

2. The edge computing device according to claim 1, wherein said household optimization engine is further configured to:

transmit said optimized household strategy to said cloud computing device;

wherein if said optimized household strategy conforms with said community optimization strategy, the edge computing device is configured to:

implement said optimized household strategy.

3. The edge computing device according to claim 1, wherein said edge computing device is further configured to, based on said instructions comprised in the strategy:

control energy distribution, from at least one energy source connected to said household, for a predetermined time-period in accordance with said instructions, wherein said energy source is at least one of a local power generation systems, a power grid system, residential battery modules and battery cells of an electric vehicle connected to said household.

4. The edge computing device according to claim 1, wherein said community optimization strategy comprises constraints, wherein said optimized household strategy is adapted to conform to said constraints.

5. The edge computing device according to claim 1, wherein said optimization engine is configured to, when determining said optimized household strategy, minimize a sum of total household electricity cost and battery aging costs of each of said at least one electric vehicles.

6. The edge computing device according to claim 1, wherein said edge computing device is configured to:

determine, by said battery aging model, a battery aging status of said at least one electric vehicle.

7. The edge computing device according to claim 1, wherein said optimization criterion further comprises local predictions for said household.

8. The edge computing device according to claim 7, wherein the local predictions comprise at least one of battery aging cost, household energy needs, energy needs of the at least one vehicle, and solar panel generation.

9. The edge computing device according to claim 1, wherein said optimized household strategy comprises a charge and discharge scheme for each one of the at least one electric vehicles associated with said household.

10. A computer-implemented method for optimizing an energy storage strategy of a household in a community comprising a plurality of households, the method comprising:

receiving a community optimization strategy from a cloud computing device, the community optimization strategy comprising instructions for controlling energy consumption of each household and energy sources in each household, wherein the instructions are indicative of an energy storage strategy for each household; and determining an optimized household strategy based on an optimization criterion comprising said community optimization strategy and a battery aging model of at least one electric vehicle associated with said household.

11. A computer-implemented method for optimizing an energy storage strategy of a community comprising a plurality of households, the method comprising the steps of:

determining a community optimization strategy being configured to optimize a collective energy storage of said community;

transmitting said community optimization strategy to each household in said community, the community optimization strategy comprising instructions for controlling energy consumption of each household and energy sources in each household, wherein the instructions are indicative of an energy storage strategy for each household;

receiving an adapted community optimization strategy from each household;

determining if each received adapted community optimization strategy conforms with said community optimization strategy; and granting implementation of each received adapted community optimization strategy that is determined as conforming with said community optimization strategy.

12. The method according to claim 11, wherein said step of determining if each received adapted community optimization strategy conforms with said community optimization strategy comprises:

evaluating if each adapted community optimization strategy deviates from constraints set in said instructions.

13. A cloud computing device configured to optimize an energy storage strategy of a community comprising a plurality of households, the cloud computing device being configured to:

transmit a community optimization strategy to each household in said community, the community optimization strategy comprising instructions for controlling energy consumption of each household and energy sources in each household, wherein the instructions are indicative of an energy storage strategy for each household;

receive an adapted community optimization strategy from each household, wherein said instructions are adapted;

determine if each received adapted community optimization strategy conforms with said community optimization strategy; and grant implementation of each received adapted community optimization strategy determined as conforming with said community optimization strategy.

14. An electric vehicle associated with a household in a community comprising a plurality of households, the electric vehicle comprising:

a battery aging model indicative of a battery aging status of a battery pack of the electric vehicle; and control circuitry configured to receive a charge and discharge scheme from an edge computing device, the edge computing device comprises a household optimization engine being configured to:

receive an at least a part of a community optimization strategy from a cloud computing device, the received community optimization strategy comprising instructions for controlling energy consumption of said household and energy sources in said household, wherein the instructions are indicative of an energy storage strategy for said household, the energy storage strategy being adapted to optimize a collective energy storage of said community; and determine, by adaptation of said instructions, an optimized household strategy based on an optimization criterion comprising said community optimization strategy and the battery aging model of the electric vehicle associated with said household.

15. A non-transitory computer-readable storage medium storing one or more programs configured to be executed by one or more control circuitry, the one or more programs including instructions, that when executed by a processor, cause the processor to perform operations comprising:

determining a community optimization strategy being configured to optimize a collective energy storage of said community;

transmitting said community optimization strategy to each household in said community, the community optimization strategy comprising instructions for controlling energy consumption of each household and energy sources in each household, wherein the instructions are indicative of an energy storage strategy for each household;

receiving an adapted community optimization strategy from each household, wherein said instructions are adapted;

determining if each received adapted community optimization strategy conforms with said community optimization strategy; and granting implementation of each received adapted community optimization strategy that is determined as conforming with said community optimization strategy.

* * * * *